Patented Sept. 27, 1938

2,131,314

UNITED STATES PATENT OFFICE 2,131,314

DYED COMPOSITION CORK AND METHOD

Giles B. Cooke, Baltimore, Md., assignor to Crown Cork & Seal Company, Inc., Baltimore, Md., a corporation of New York No Drawing. Application November 16, 1935, Serial No. 50,241

3 Claims. (Cl. 18—48)

The present invention relates to a method for the production of composition cork bodies, such as sheets, slabs, strips, etc., dyed by impregnation, and to the cork bodies so produced.

Composition cork bodies as herein contemplated have hitherto been dyed by surface application. Such products have been unsatisfactory since, while the main purpose has been to provide an exposed decorative surface, this surface, by reason of its exposure, is subject to wear, and in time loses its uniformity of appearance and, hence, its attractiveness. According to my improved process, the dye is made to permeate the cork body throughout so that even in the case of surface injury, uniformity of color effect is retained. A great advantage of the specific method of impregnation to be herein disclosed resides in the fact that it is carried out in the baking operation usual in the production of undyed composition cork bodies.

In the ordinary manufacture of composition cork bodies, granulated cork is mixed with a binder and plasticizer, or softener, then confined under pressure in a mold and baked to remove the volatiles, the mold giving the required form to the product. According to the present invention, I add to the original mix a suitable dye solution, which solution, due to the softening of the cork cell walls during the baking operation, is dispersed throughout the cork particles. The softening of the cork particles is effected by the plasticizing or softening agent and/or by the dye solvent. The solvent and softening agent may be distinct ingredients or may be a single ingredient with double function. The only requisite is a dye which is soluble and which, in solution, is miscible with the other agents and may be made to permeate the cork cell walls during the baking operation.

In the use of a water soluble dye, as an example, thirty grams of the dye are dissolved in water, the solution added to one hundred and fifty grams of hot glue gel (glue and glycerine), and the whole thoroughly mixed with four hundred and fifty grams of granulated cork. The mixture is pressed into a mold and heated at around 250° F. for about four hours. The glycerine and the water during heating, cause the cork particles to soften and swell, the dye solution entering each cork cell, permeating the cell membranes, and carrying with it the coloring matter. Since the water is an addition to the other volatiles, the baking process, at a given temperature, requires a somewhat longer than ordinary period of time to secure proper elimination of the volatiles.

The following water soluble dyes (commercial designations) have proven satisfactory with a glue gel binder:

Calcocid Green C. G. Extra
Calcocid Blue Black, Extra Conc.
Calcocid Brilliant Red B.

These dyes are used in the ratio of about four ounces to about three pounds of granulated cork.

The method may be carried out with all water soluble dyes, both acid and basic types. The method is not confined to the use of water soluble dyes but spirit soluble dyes may be used by dissolving the dye in alcohol, benzene, or other suitable volatile solvent. The spirit soluble dye can be dissolved in the cork softening agent, such as glycerine or glycol, and oil soluble dyes may be used when softening agents such as sulfonated corn oil or sulfonated castor oil are employed. The binder is not limited to glue but albumen, casein, latex, phenol-formaldehyde resins, urea-formaldehyde resins, etc., or mixtures of such may be used. However, it is important to select the proper dye to be used with a given binder and a particular softening agent.

A stronger composition is obtained when a resin binder or a binder of resin and glue is used than when the binder consists of glue alone, and with a resin or resinous binder, a spirit soluble dye is preferable. As an example, six ounces of spirit soluble dye dissolved in twelve ounces of alcohol may be mixed with eight ounces of resin and eight ounces of glue gel, the whole being mixed with three pounds of granulated cork.

It should be stated that in some cases it is preferable to coat the cork thoroughly with the dye solution and then admix the binder. This sequence has been used with the formula just mentioned, the baking being continued for four and one-half hours at a temperature of 285° F. Of course, the temperature and the baking period may be varied and will necessarily vary to some extent in accordance with the form or mass of the body to be produced. It is only necessary that the baking be at a sufficient temperature and continued for a sufficient period to effect permeation and to remove the volatiles.

With reference to the selection of the dye, I have found that water soluble dyes are preferable, for example, with a glue or casein binder, while spirit soluble dyes are more satisfactory when a resin binder is used. The ingredients must be compatible. For example, in using phenolic resin binder, the dye must be of a nature not to fade or change color in the presence of phenolic resins at temperatures around 300° F. Also the dye should be spirit soluble. Under such conditions, the following dyes (commercial designations) may be mentioned as satisfactory:

Condensation Black, 1500–V
    Condensation Green, V–5
    Nigrosine W S J.

To avoid any possibility of the dye running when the dyed body is washed for instance with water, the correct quantity of dye should be used, the exact amount of a given dye, of course, depending upon its tinctorial quality. In the case of the dyes just mentioned, about six ounces should be used to about three pounds of composition cork.

The cork particles may be of any size within reasonable limits. I have successfully used sizes up to five mesh with no indication that larger sizes could not be used if desired.

The new product has many advantageous uses. In the form of sheets it may be applied to walls with appropriate decorative effect, in addition to its qualities of sound absorption and heat insulation. The composition cork in the selected color or colors and desired thickness may be applied to walls by a suitable adhesive and while the exposed surface may be lacquered or varnished, the natural finish is preferable. The surface is easily cleaned by sanding and may be washed with water, for example, without damage. The natural surface is particularly effective when absorption and soft reflection of light is desired. The product is useful as material for use in window and room displays, bulletin boards, card table tops, desk writing pads, and in innumerable other connections.

By "uniformly colored" is meant a product which has the color applied throughout its mass to both the cork particles and to the binder before molding.

It will be understood that the particular dyes, solvents, binders, softeners, etc., mentioned, are merely typical and that I do not limit myself in these respects, nor in respect to baking heats and pressures and the external form of the product. The word "body" is used in the following claims in its broadest scope.

I claim:

1. The method of producing dyed cork bodies of composition cork comprising mixing cork particles with a dye in solution, a heat setting binder, and a cork softening agent, the dye solvent and softening agent being compatible with the binder, and heating the mixture in a mold for setting the binder and for simultaneously softening the particles to cause the dye to uniformly permeate the cork particles.

2. The method of producing dyed cork bodies of composition cork comprising mixing cork particles with a dye in solution, and a heat setting binder, the dye solvent being compatible with the binder, and heating the mixture in a mold for setting the binder and for simultaneously softening the particles to cause the dye to uniformly permeate the cork particles.

3. A colored molded cork composition article consisting of cork particles and a binder, and including a softening agent for the cork and a dye, the cork predominating by volume and the binder, dye and softening agent being present in amount insufficient to interfere with the cork properties of the cork particles so that the product exerts the characteristics of the cork, the cork, binder and softening agent all being uniformly colored by said dye throughout the body of the article.

GILES B. COOKE.